United States Patent [19]

Koester et al.

[11] 4,018,882

[45] Apr. 19, 1977

[54] MANUFACTURE OF GAMMA-IRON (III) OXIDE

[75] Inventors: Eberhard Koester, Frankenthal; Gerd Wunsch, Speyer; Eduard Schoenafinger, Ludwigshafen; Hans Henning Schneehage, Mutterstadt; Helmut Jakusch, Ludwigshafen, all of Germany

[73] Assignee: BASF Aktiengesellschaft, Ludwigshafen, Germany

[22] Filed: Sept. 25, 1975

[21] Appl. No.: 616,863

[30] Foreign Application Priority Data

Oct. 4, 1974 Germany .......................... 2447386

[52] U.S. Cl. .................................................. 423/634
[51] Int. Cl.² ........................................ C01G 49/02
[58] Field of Search ................. 423/633, 634, 146; 252/62.56

[56] References Cited

UNITED STATES PATENTS

| 2,558,303 | 6/1951 | Marcot et al. | 423/633 |
| 2,558,304 | 6/1951 | Marcot et al. | 423/633 |
| 3,399,142 | 8/1968 | Conley | 423/634 |
| 3,498,748 | 3/1970 | Greiner | 252/62.56 |
| 3,700,595 | 10/1972 | Kaiser | 252/62.56 |

FOREIGN PATENTS OR APPLICATIONS 647,505  1959  U.S.S.R. .......................... 252/62.56

OTHER PUBLICATIONS

Def. Pub. of Oct. 21, 1969, No. 819,977; 867O.G.749.

*Primary Examiner*—Oscar R. Vertiz
*Assistant Examiner*—Wayne A. Langel
*Attorney, Agent, or Firm*—Johnston, Keil, Thompson & Shurtleff

[57] ABSTRACT

A process for the manufacture of acicular magnetic gamma-iron(III) oxide by reducing acicular alpha-iron-(III) oxide to magnetite and then oxidizing it to gamma-iron(III) oxide, wherein the alpha-iron(III) oxide is treated with a water-soluble alkaline earth metal compound and an alkylphenol with one to three alkyl radicals, each of 4 to 24 carbon atoms, on the benzene nucleus. Gamma-iron(III) oxides manufactured in this way show better magnetic orientability in the binder-containing dispersion, and a higher coercive force than prior art magnetic pigments.

5 Claims, No Drawings

MANUFACTURE OF GAMMA-IRON (III) OXIDE

The present invention relates to a process for the manufacture of acicular gamma-iron(III) oxide which is particularly suitable for use in magnetic recording media.

Acicular gamma-iron(III) oxide with a length/width ratio of the needles of 20:1 to 3:1 is still the magnetic pigment predominantly used in magnetic recording media. It is manufactured by dehydrating non-magnetic acicular goethite to alpha-iron(III) oxide, reducing this to magnetite and reoxidizing the latter to gamma-iron(III) oxide.

The size and shape of the particles have a decisive effect on the magnetic properties, especially the coercive force, of gamma-iron(III) oxide. Whilst the size and shape of the magnetic gamma-iron(III) oxide particles are largely determined by the dimensions of the non-magnetic goethite or alpha-iron(III) oxide particles employed for conversion to gamma-iron(III) oxide, the way in which the conversion is carried out also plays a decisive role. The orientability of the magnetic particles, i.e. the degree to which they can be oriented in a magnetic field immediately after application of the binder layer, containing the magnetic material, to the base, also depends in part on the shape of the acicular particles.

Hence, special measures have to be taken, when manufacturing gamma-iron(III) oxide, to ensure that the acicular shape of the goethite, produced by precipitation, is retained during the reduction and oxidation which are carried out. To avoid sintering of the particles at the conversion temperatures which give favorable magnetic properties, processes have been disclosed in which sintering is prevented by coating the surface of the non-magnetic oxide starting materials with inorganic substances (German Published Applications (DOS) Nos. 1,592,214 and 1,803,783). It has also already been proposed to treat goethite with solutions of aluminum, titanium or zirconium salts and alkali metal silicates, the pH of the solutions being adjusted to values at which hydrolysis starts (German Printed Application (DAS) No. 1,252,646).

Whilst these methods make it possible to substantially retain the acicular shape during the conversion process, the gamma-iron(III) oxides thus obtained are frequently difficult to disperse in an organic binder. Moreover, the relatively poor orientability of such coated particles has an adverse effect on the quality of the magnetic recording medium.

German Printed Application (DAS) No. 1,771,326 describes the coating of goethite or alpha-iron(III) oxide with a hydrophobic aliphatic carboxylic acid or with such an acid and morpholine, followed by the direct conversion of the pigments treated in this way to gamma-iron(III) oxide in air at elevated temperature. However, this direct conversion has the disadvantage that it is no longer possible to carry out a heat treatment at intermediate stages of the manufacture of the gamma-iron(III) oxide; such a heat treatment is of particular advantage when manufacturing low-noise iron oxides with low print-through properties for use as magnetic pigments in magnetic recording media. A similar coating of iron oxide pigments to avoid agglomeration after manufacture, as disclosed in German Printed Application (DAS) No. 1,767,608, has the disadvantage that the pigment suspension used must first be brought to a pH of about 7, which may entail extra expenditure depending on the manufacturing process.

It has already been proposed to treat non-magnetic iron oxides with organic materials and to heat the so-treated non-magnetic iron oxide in air in order to bring about the reduction and oxidation thereof.

For example, German Patent 801,352 discloses the use of salts of organic fatty acids, and similar processes are described in German Printed Application 1,203,656 and GDR Patent 91,017. The use of various compounds is also disclosed in German Published Application (DOS) No. 2,064,804. However, these processes all suffer from the above disadvantages.

It is an object of the present invention to provide a process in which a simple treatment of the starting pigments, i.e. goethite or alpha-iron(III) oxide, results, after the conventional conversion to gamma-iron(III) oxide, in a magnetic material for magnetic recording media which in particular exhibits improved magnetic orientability coupled with improved coercive force.

We have found that this object is achieved by a process for the manufacture of acicular magnetic gamma-iron(III) oxide by reduction of acicular non-magnetic iron(III) oxide to magnetite and subsequent oxidation to gamma-iron(III) oxide, wherein said iron(III) oxide is treated with a water-soluble alkaline earth metal compound and an alkylphenol which has from one to three alkyl radicals, ech of 4 to 24 carbon atoms, on the benzene nucleus, and is then reduced with a conventional gaseous reducing agent, at from 300° to 500° C, to magnetite, which is oxidized with an oxygen-containing gas, at from 200° to 400° C, to gamma-iron(III) oxide.

A molar ratio of the alkaline earth metal compound to the alkylphenol of from 1:0.2 to 1:2, especially from 1:0.4 to 1:1.5, has been found advantageous in the process of the invention.

Phenols suitable for use in the process of the invention have the following formula I:

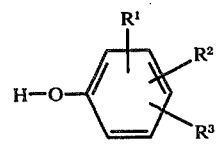

wherein $R^1$, $R^2$ and $R^3$ are hydrogen or alkyl of 4 to 24 carbon atoms, but at least one is alkyl. Monosubstituted and disubstituted phenols wherein alkyl is of 4 to 12 carbon atoms have proved particularly advantageous.

Examples of such compounds are butylphenol, di-n-butylphenol, di-n-nonylphenol and especially p-dodecylphenol.

Suitable alkaline earth metal compounds are all water-soluble inorganic magnesium, barium, calcium or strontium compounds, but the hydroxides, and especially barium hydroxide, are particularly suitable.

The compounds added according to the invention may each be used in amounts of from 1 to 5, preferably from 2 to 4, percent by weight based on the iron oxide starting material. The amount required, within the stated limits, depends on the particle size and surface structure of the pigments to be treated.

The process of the invention is applicable to all suitable starting materials for the manufacture of magnetic iron oxides, especially to goethite particles of a great variety of needle sizes and to modified pigments, e.g. cobalt-modified goethite.

The treatment of the acicular goethite or alpha-iron(III) oxide may conveniently be carried out in a fine slurry of the pigment in water. To this is added the aqueous solution of the alkaline earth metal compound followed by the aqueous emulsion of the alkylphenol and the mixture is dispersed mechanically. This results in complete absorption of the alkylphenol on the surface of the pigment. After filtration and drying, the treated acicular non-magnetic iron oxide is converted to magnetite in the conventional manner using gaseous reducing agents, usually hydrogen, at from 300° to 500° C, and the magnetite is converted to gamma-iron(III) oxide with gaseous oxidizing agents, usually air, at from 200° to 350° C.

The magnetic gamma-iron(III) oxides manufactured in accordance with the invention exhibit a higher degree of orientation in the magnetic coating of a magnetic recording medium and also a higher coercive force than prior art gamma-iron(III) oxides.

To manufacture magnetic coatings, the gamma-iron(III) oxide manufactured according to the invention is dispersed in polymeric binders. Suitable binders for this purpose are conventional compounds, e.g. homopolymers and copolymers of polyvinyl derivatives, polyurethanes, polyesters and the like. The binders are used as solutions in suitable organic solvents, which may contain further additives, e.g. to improve the conductivity and abrasion resistance of the magnetic coatings. On grinding the magnetic pigment, the binder and any additives, a homogeneous dispersion is obtained which is applied to rigid or flexible bases such as films, discs or cards; the magnetic particles contained therein are then oriented by a magnetic field and the coating is solidified by drying.

For a given packing density, these magnetic recording media exhibit a higher orientation ratio than those manufactured with conventional gamma-iron(III) oxides, and also a higher coercive force. These improved magnetic properties result in better electro-acoustic properties, e.g. greater sensitivity, a higher maximum output level at long and short wavelengths and a high signal-to-noise ratio.

The invention is further illustrated by the following Examples in which the parts and percentages are by weight.

The magnetic properties of the pigments were measured with a vibrating sample magnetometer at a field strength of 160 kiloamps/m, the coercive force $H_c$ being given in kiloamps/m and the specific remanence $M_r$ and the specific saturation magnetization $M_m$ in $nTm^3/g$ at an apparent density $d$ in $g/cm^3$. The improved orientability of the particles was determined from measurements on the magnetic tape. The orientation ration RF is the ratio of residual induction in the direction of orientation to that in the crosswise direction. The magnetic recording media required for this purpose were produced by dispersing the gamma-iron(III) oxide, obtained in accordance with the following Examples, in a solution of a copolymer of 8 parts of vinyl chloride, 1 part each of diethyl maleate and dimethyl maleate and of a polyether-urethane based on polytetrahydrofuran, using conventional dispersing aids, applying this dispersion by a conventional method to a 12 $\mu$ thick polyethylene terephthalate film in an amount which gives a 5 $\mu$ thick magnetic coating after drying, orienting the particles in the fluid coating using a magnetic field, and drying the coating.

EXAMPLE 1

100 parts of acicular alpha-FeOOH manufactured in alkaline medium are dispersed for 15 minutes in 1,500 parts of water, together with 2 parts of $Ba(OH)_2.8H_2O$ in 300 parts of water. An emulsion of 2 parts of p-dodecylphenol in 1,000 parts of water is then added and dispersion is continued for 15 minutes. The treated alpha-FeOOH is filtered off, dried at 100° C under slightly reduced pressure, reduced to $Fe_3O_4$ at 380° C in a stream of hydrogen, cooled to 250° C and oxidized to gamma-$Fe_2O_3$ with a mixture of nitrogen and air. The magnetic properties of the pigment and the orientation ratio of a tape manufactured therewith are given in Table 1.

EXAMPLE 2

The procedure of Example 1 is followed except that 4 parts of $Ba(OH)_2.8H_2O$ and 2 parts of p-dodecylphenol are added. The magnetic properties of the pigment and the orientation ratio of a tape manufactured therewith are given in Table 1.

EXAMPLE 3

5 parts of $Ba(OH)_2.8H_2O$ and 4 parts of p-dodecylphenol are reacted analogously to Example 1. The magnetic properties of the pigment and the orientation ratio of a tape manufactured therewith are given in Table 1.

COMPARATIVE EXPERIMENT 1

Untreated alpha-FeOOH, as employed in Example 1, is converted to gamma-$Fe_2O_3$ as described in Example 1. The magnetic properties of the pigment and the orientation ratio of a tape manufactured therewith are given in Table 1.

COMPARATIVE EXPERIMENT 2

100 parts of acicular alpha-FeOOH, as used in Example 1, are added to 1,500 parts of water and dispersed, together with an emulsion of 2 parts of p-dodecylphenol in 1,000 parts of water, for 15 minutes. The product is filtered off and dried at 100° C under slightly reduced pressure. The treated alpha-FeOOH is converted to gamma-$Fe_2O_3$ as described in Example 1. The magnetic properties of the pigment and the orientation ratio of a tape manufactured therewith are given in Table 1.

COMPARATIVE EXPERIMENT 3

100 parts of alpha-FeOOH, as employed in Example 1, are dispersed in 1,500 parts of water, together with 4 parts of barium hydroxide octahydrate $Ba(OH)_2.8H_2O$ dissolved in 300 parts of water, for 15 minutes. The product is worked up and converted to gamma-$Fe_2O_3$ as described in Example 1. The magnetic properties of the pigment and the orientation ratio of a tape manufactured therewith are given in Table 1.

TABLE 1

| Experiment | Alpha-FeOOH treatment % of Ba(OH)$_2$ . 8H$_2$O | % of p-dodecylphenol | Magnetic properties of gamma-Fe$_2$O$_3$ H$_c$ | d | M$_R$ | M$_m$ | M$_r$/M$_m$ | RF |
|---|---|---|---|---|---|---|---|---|
| Example 1 | 2 | 2 | 35.8 | 0.632 | 40 | 79 | 0.51 | 3.0 |
| Example 2 | 4 | 2 | 34.3 | 0.637 | 41 | 80 | 0.51 | 2.9 |
| Example 3 | 5 | 4 | 33.3 | 0.642 | 39 | 77 | 0.51 | 3.1 |
| Comparative experiment 1 | — | — | 22.6 | 0.931 | 40 | 86 | 0.47 | 1.6 |
| Comparative experiment 2 | — | 2 | 32.8 | 0.739 | 36 | 78 | 0.46 | 2.7 |
| Comparative experiment 3 | 4 | — | 30.1 | 0.857 | 36 | 76 | 0.47 | 2.0 |

EXAMPLE 4

100 parts of alpha-FeOOH, as used in Example 1, are dispersed in 1,500 parts of water, and 100 parts of an aqueous solution of 12 parts of cobalt(II) nitrate hexahydrate Co(NO$_3$)$_2$.6H$_2$O and 3 parts of barium nitrate Ba(NO$_3$)$_2$ are added. Aqueous ammonia solution is added dropwise, whilst stirring, until the pH is 10. An aqueous emulsion of 3 parts of p-dodecylphenol in 1,000 parts of water is then added, the mixture is dispersed for 15 minutes and the product is then filtered off and dried at 100° C under slightly reduced pressure. It is then converted to gamma-Fe$_2$O$_3$ as described in Example 1. The magnetic properties of the pigment and the orientation ratio of a tape manufactured therewith are given in Table 2.

COMPARATIVE EXPERIMENT 4

100 parts of alpha-FeOOH, as used in Example 1, are dispersed in 1,500 parts of water, and 100 parts of an aqueous solution of 12 parts of cobalt(II) nitrate hexahydrate Co(NO$_3$)$_2$.6H$_2$O are added. The pH is brought to 10 by the dropwise addition of ammonia and the product is then filtered off and dried at 100° C under slightly reduced pressure. It is then converted to gamma-Fe$_2$O$_3$ as described in Example 1. The magnetic properties of the pigment and the orientation ratio of a tape manufactured therewith are given in Table 2.

TABLE 2

| Experiment | Alpha-FeOOH treatment % of CO | % of Ba(NO$_3$)$_2$ | % of p-dodecyl phenol | Magnetic properties of gamma-Fe$_2$O$_3$ H$_c$ | d | M$_r$ | M$_m$ | M$_r$/M$_m$ | RF |
|---|---|---|---|---|---|---|---|---|---|
| Example 4 | 2.6 | 3 | 3 | 39.6 | 0.727 | 40 | 79 | 0.51 | 3.2 |
| Comparative experiment 4 | 2.6 | — | — | 38.5 | 0.772 | 41 | 81 | 0.51 | 2.3 |

EXAMPLE 5

100 parts of alpha-FeOOH, as employed in Example 1, are dispersed in 1,500 parts of water, and 100 parts of an aqueous solution of 2 parts of calcium nitrate Ca(NO$_3$)$_2$ are added. The pH is brought to 9 by the dropwise addition of aqueous ammonia solution. 1,000 parts of an aqueous emulsion of 4 parts of p-dodecylphenol are then added, the mixture is dispersed for 15 minutes and the product is worked up and converted to gamma-Fe$_2$O$_3$ as described in Example 1. The magnetic properties of the pigment and the orientation ratio of a tape manufactured therewith are given in Table 3.

COMPARATIVE EXPERIMENT 5

100 parts of alpha-FeOOH, as used in Example 1, are dispersed in 1,500 parts of water, and 100 parts of an aqueous solution of 2 parts of calcium nitrate Ca(NO$_3$)$_2$ are added. The pH is brought to 9 by the dropwise addition of ammonia and the product is worked up and converted to gamma-Fe$_2$O$_3$ as described in Example 1. The magnetic properties of the pigment and the orientation ratio of a tape manufactured therewith are given in Table 3.

EXAMPLE 6

The procedure of Example 1 is followed except that 2 parts of Ba(OH)$_2$.8H$_2$O and 2 parts of 3,5-dinonylphenol are added. The magnetic properties of the pigment and the orientation ratio of a tape manufactured therewith are given in Table 3.

TABLE 3

| Experiment | Alpha-FeOOH treatment % of Ca(NO$_3$)$_2$ | % of p-dodecyl-phenol | Magnetic properties of gamma-Fe$_2$O$_3$ H$_c$ | d | M$_r$ | M$_m$ | M$_r$/M$_m$ | RF |
|---|---|---|---|---|---|---|---|---|
| Example 5 | 2 | 4 | 32.4 | 0.682 | 40 | 80 | 0.50 | 2.8 |
| Comparative experiment 5 | 2 | — | 29.6 | 0.879 | 38 | 81 | 0.47 | 2.2 |
| | % of Ba(OH)$_2$ . 8H$_2$O | % of 3,5-dinonylphenol | | | | | | |
| Example 6 | 2 | 2 | 32.6 | 0.628 | 39 | 78 | 0.50 | 2.9 |

We claim:

1. A process for producing acicular magnetic gamma-iron(III) oxide comprising the steps of:
    a. suspending an acicular non-magnetic iron(III) oxide in water to form a slurry,
    b. adding to said slurry a solution of a water-soluble inorganic alkaline earth metal compound, said alkaline earth metal selected from the group consisting of magnesium, calcium, barium and strontium, in an amount of from 1 to 5 percent by weight of the alkaline earth metal compound based on the iron(III) oxide, c. adding to said slurry an alkylphenol of the formula

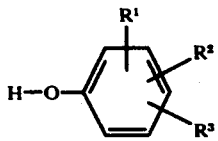

wherein $R^1$, $R^2$ and $R^3$ are hydrogen or alkyl of 4 to 24 carbon atoms, with the proviso that at least one of $R^1$, $R^2$ and $R^3$ is alkyl, in a molar ratio of alkylphenol to alkaline earth metal compound of 0.2 to 2.0:1, d. filtering the slurry,
e. drying the residue,
f. reducing the residue consisting essentially of non-magnetic iron(III) oxide with a gaseous reducing agent at from 300° to 500° C, to magnetite; and subsequently
g. oxidizing the magnetite with an oxygen-containing gas, at from 200° to 400° C, to gamma-iron(III) oxide.

2. A process as set forth in claim 1, wherein the acicular non-magnetic iron(III) oxide is acicular goethite.

3. A process as set forth in claim 1 wherein the alkaline earth metal compound is a hydroxide selected from the group consisting of barium hydroxide, magnesium hydroxide, calcium hydroxide and strontium hydroxide.

4. A process as set forth in claim 1 wherein the alkaline earth metal compound is selected from the group consisting of barium hydroxide, barium nitrate and calcium nitrate.

5. A process as set forth in claim 1 wherein the alkylphenol is a mono-alkyl-substituted phenol.